United States Patent [19]

Yokota et al.

[11] Patent Number: 4,789,856
[45] Date of Patent: Dec. 6, 1988

[54] DISPLAY APPARATUS WITH INTERFACE CABLE FOR TRANSFERING IMAGE DATA TO CRT IN PARALLEL FORMAT

[75] Inventors: Tsuneshi Yokota, Kawasaki; Osamu Kondo, Yokohama, both of Japan

[73] Assignee: Kabushiki Kaisha Toshiba, Kawasaki, Japan

[21] Appl. No.: 811,739

[22] Filed: Dec. 20, 1985

[30] Foreign Application Priority Data

Dec. 25, 1984 [JP] Japan .................. 59-278431

[51] Int. Cl.$^4$ .............................................. G09G 1/00
[52] U.S. Cl. ...................... 340/720; 340/732; 340/749; 340/800
[58] Field of Search ............. 340/720, 723, 732, 744, 340/749, 750, 800; 355/14 R; 358/296, 133, 141, 142; 375/38

[56] References Cited

U.S. PATENT DOCUMENTS

| | | | |
|---|---|---|---|
| 4,437,127 | 3/1984 | Hirose | 358/296 |
| 4,521,803 | 6/1985 | Gittinger | 358/141 |
| 4,604,615 | 8/1986 | Funahashi | 340/750 |
| 4,639,890 | 1/1987 | Heilveil et al. | 340/750 |

*Primary Examiner*—Gerald L. Brigance
*Assistant Examiner*—Jeffery A. Brier
*Attorney, Agent, or Firm*—Finnegan, Henderson, Farabow, Garrett & Dunner

[57] ABSTRACT

A document filing apparatus is provided with a main unit for outputting parallel bit data, and a display device coupled to the main unit through an interface cable having a plurality of bit transmission lines. The display device comprises a multiplier circuit for multiplying the frequency of a clock pulse at a predetermined frequency, a parallel-in/serial-out shift register for receiving an image signal obtained by finely scanning a document, via the interface cable, as parallel image data, and for converting the parallel image data into serial image data in synchronism with a multiplied clock pulse signal from the multiplifer circuit, and cathode-ray tube for displaying image data obtained from the shift register as an image.

6 Claims, 2 Drawing Sheets

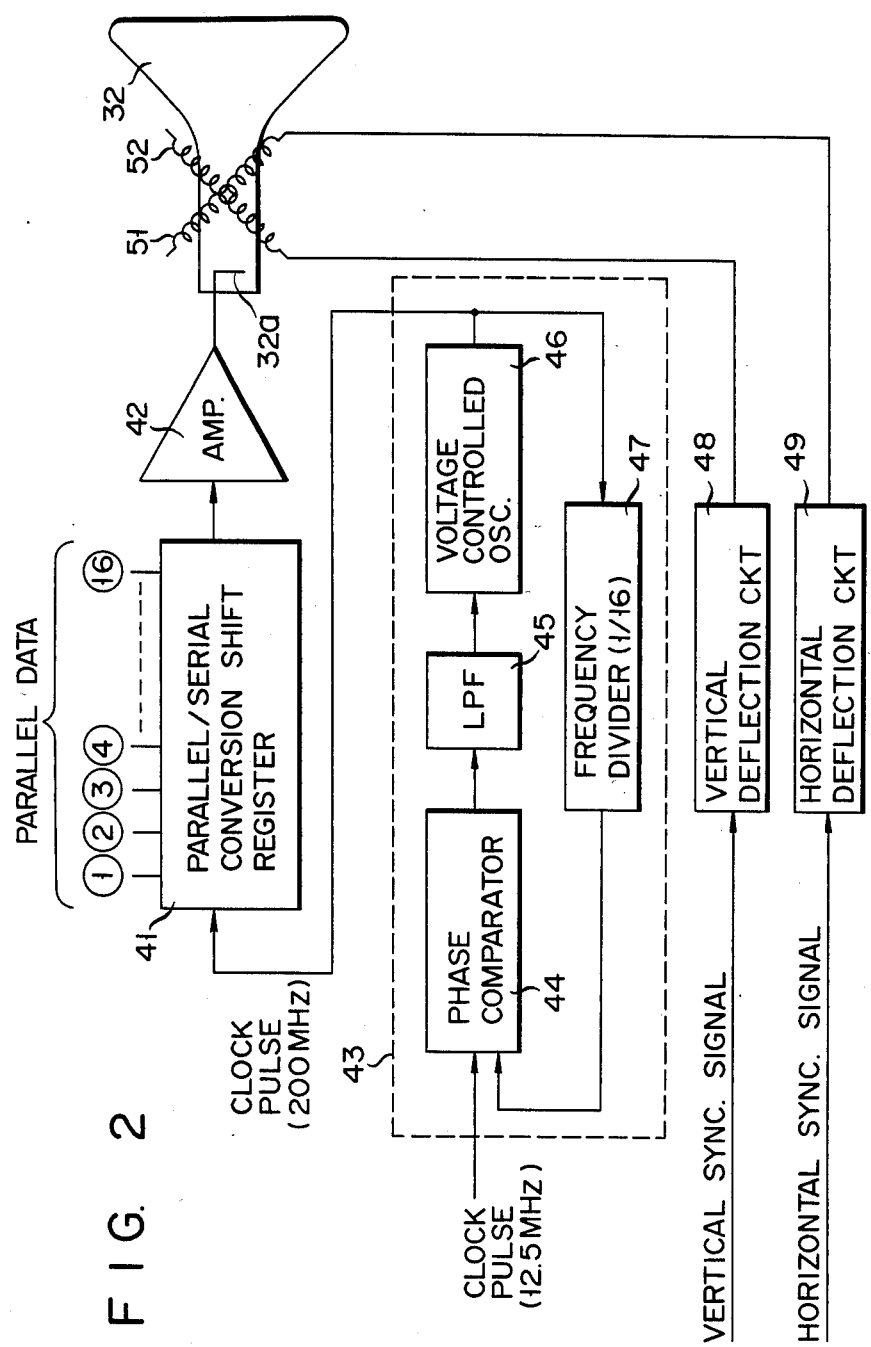
F I G. 2

DISPLAY APPARATUS WITH INTERFACE CABLE FOR TRANSFERRING IMAGE DATA TO CUT IN PARALLEL FORMAT

BACKGROUND OF THE INVENTION

This invention relates to a document filing apparatus provided with an ultra high resolution display device using a cathode ray tube.

A document filing apparatus is used for recording and reproducing the information of a document on and from a recording medium. This document filing apparatus has a main unit and a display unit coupled to the main unit through an interface cable. The document is scanned by a document scanner. When the document information obtained from the scanner is transferred to the CRT display device through the interface cable, the document information is displayed on the CRT display device. In this case, the serial signal data corresponding to the document information and also vertical and horizontal synchronizing signals are signal-processed in the main unit and supplied to the CRT display device. Like the conventional television receiver, the CRT display device may have 525 scanning lines, a vertical synchronizing signal frequency of 60 Hz and a horizontal synchronizing signal frequency of approximately 15.75 kHz. In this case, the upper limit frequency of the serial signal data is 4 to 5 MHz, so that data transfer can be readily effected with an ordinary interface. However, in a display device where an ultra high resolution is required for image display, it is necessary to scan a document of an A4 size optically with a scanning density of about 8 lines/mm to obtain ultra high resolution data for display on a cathode-ray tube. In order to obtain display of such high resolution data on the cathode-ray tube directly and without flicker, it is necessary that the apparatus have at least 2,400 effective scanning lines, 1,792 effective horizontal dots and a vertical deflection frequency of 60 Hz. To meet these conditions, a frequency in excess of 100 MHz is required for data. Because such high-frequency data is transferred via an interface cable, it is liable to contain noise components such that it cannot accurately be displayed.

SUMMARY OF THE INVENTION

The invention has an object of providing a display apparatus which can readily display ultra high resolution data.

According to the invention, a document filing apparatus is provided with a main unit for producing parallel data corresponding to document information, and a CRT display device coupled with the main unit through an interface cable. The CRT display device comprises a frequency multiplier for multiplying the frequency of a clock pulse signal at a predetermined frequency, a parallel-in/serial-out shift register for converting the parallel data into serial data in synchronism with the frequency-multiplied clock pulse output of the frequency multiplier, and a cathode-ray tube for displaying serial data from the parallel-in/serial-out shift register.

BRIEF DESCRIPTION OF THE DRAWINGS

FIG. 2 is a circuit diagram showing a display device shown in FIG. 1.

DETAILED DESCRIPTION OF THE PREFERRED EMBODIMENTS

Figure 1:
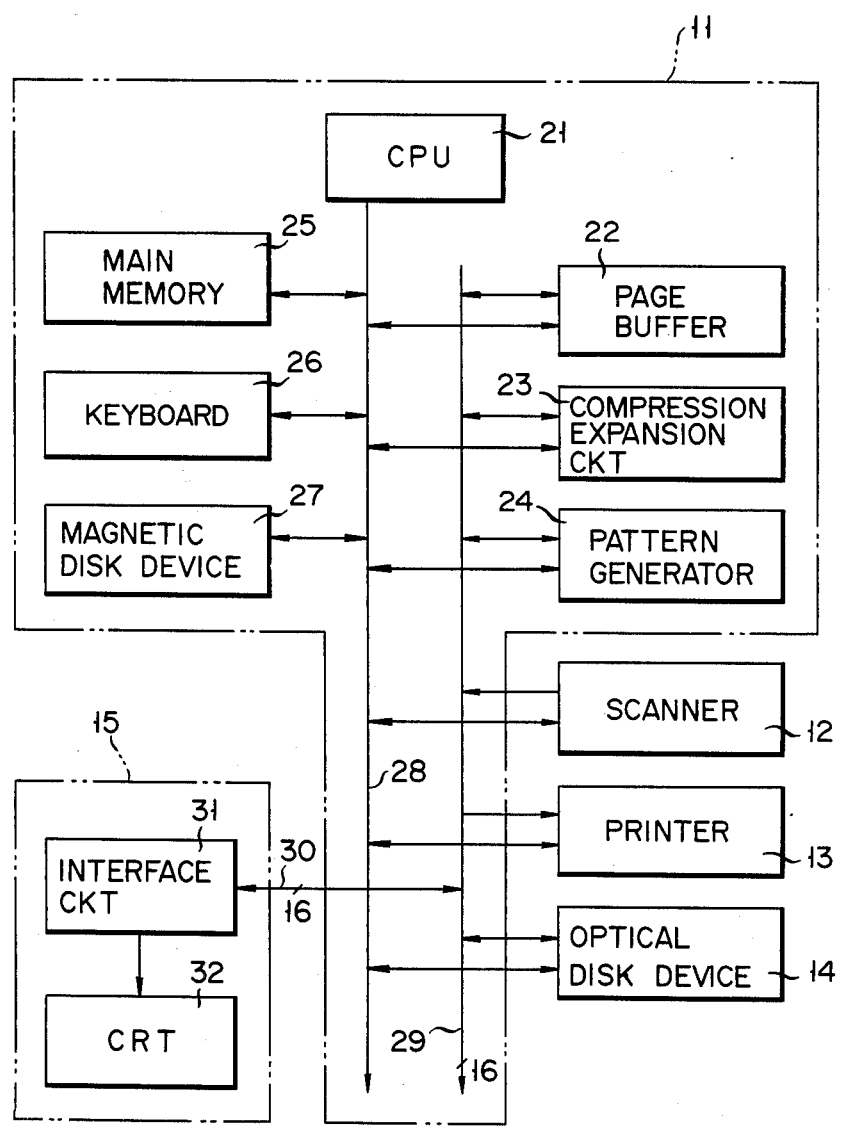
FIG. 1 is a block diagram showing a document filing apparatus provided with an embodiment of the display device according to the invention.

The document filing system shown in FIG. 1 comprises main unit 11, scanner 12, printer 13, optical disk device 14 and display 15. Scanner 12, printer 13, optical disk device 14 and display 15 are connected to main unit 11. Main unit 11 includes CPU 21 which can perform various control operations. CPU 21 is connected to page buffer 22, compression/expansion circuit 23, pattern generator 24, main memory 25, keyboard 26, and magnetic disk device 27 via CPU bus 28 including data lines and control lines. Image bus 29 is connected to the image data output ports of page buffer 22, compression/expansion circuit 23, pattern generator 24, scanner 12, printer 13, optical disk device 14 and display device 15, to permit transmission of 16-bit parallel image data on it. Scanner 12 connected to image bus 29 provides 16-bit parallel data representing image data obtained through scanning of a document with a resolution of 8 lines/mm.

Main memory 25 is stored with various programs, management information, etc. CPU 21 excutes filing operations according to the programs. The page buffer 22 stores the document information of scanner 12. Compression/expansion circuit 23 has functions for reducing the redundancy of the document information and for decoding the document information subjected to the redundancy reduction. Page buffer 22 transfers the document information to and from compression/expansion circuit 23. Pattern generator 24 is stored with pattern information items representing characters and symbols. Magnetic disk device 27 is stored with the retrieval data corresponding to the document information.

Printer 13 is used for outputting the document information as a hard copy. The optical disk device 14 records the document information on an optical disk.

Display device 15 connected to main unit 11 via interface cable 30 including 16-bit transmission lines comprises a ultra high resolution device. Display device 15 includes interface circuit 31 for converting 16-bit parallel data into serial data fed to cathode-ray tube 32.

FIG. 2 shows a detailed circuit construction of display device 15 including interface circuit 31. In this circuit, 16 bit transmission lines of interface cable 30 connected to main unit 11 are connected to parallel-in/serial-out shift register 41. Shift register 41 has an output terminal connected to cathode 32 of cathode-ray tube 32 through video amplifier 42. Shift register circuit 41 has a clock pulse input terminal connected to the output terminal of PLL (phaselocked loop) circuit 43 functioning as a frequency multiplier. The clock pulse input to PLL circuit 43 is outputted from main unit 11.

PLL circuit 43, as is well known, comprises phase comparator 44, low pass filter 45, voltage controlled oscillator 46 and frequency divider 47. Frequency divider 41 has a frequency division ratio of 1/16.

Vertical and horizontal deflection circuits 48 and 49 are connected to vertical and horizontal deflection coils 50 and 51 provided on CRT 32.

In the document filing system as described above, when document of A4 size is scanned by scanner 12 with a scanning density of 8 lines, scanner 12 outputs document information. The document information with a scanning density of 8 lines/mm is provided as serial data. The serial data is converted to 16-bit parallel data. The 16-bit parallel data is output from the scanner in synchronism with the clock pulse signal having 12.5 MHz. The 16-bit parallel data is fed through 16 bit transmission lines 30 to parallel-in/serial-out shift register 41 to be converted to serial data. The 16-bit parallel data is converted to serial data in synchronism to a clock pulse signal at a frequency of 200 MHz from PLL circuit 43. The clock pulse signal at 200 MHz is formed in PLL circuit 43 through multiplication of a clock pulse signal at 12.5 MHz by 16.

The series data from shift register 41 is amplified by video amplifier 42, the output of which is fed to cathode 32a of cathode-ray tube 32. Image data thus is displayed on cathode-ray tube 32 as an image of ultra high resolution consisting of 2,400 scanning lines.

As has been shown, the image information with an ultra high density is transmitted as parallel data constituted by a plurality of bits to the display device on transmission lines. The transmission data frequency thus is considerably reduced, so that document information with an ultra high density can be readily transmitted. Document information obtained with 2,400 scanning lines must be transmitted at 100 MHz as serial data. Such high frequency data, however, can not be readily transmitted. According to the invention, the same data is transmitted as 16-bit parallel data. Therefore, each bit data has a frequency of 100 MHz/16=6.25 MHz, which is sufficiently low compared to 100 MHz. Thus, even if interface cable 30 is long, document information can be very readily transmitted without any trouble. In other words, restrictions on the positional relation between main unit 11 and display device 15 are precluded, that is, display device 15 can be disposed in any positional relation to main unit 11.

What is claimed is:

1. An image filing apparatus, comprising:
   image data output means for outputting image data corresponding to an image as a plurality of parallel bits of data;
   display means for displaying the image data as an image having a high resolution, the display means being disposed separate from the image data output means;
   an interface cable having a plurality of transmission lines for coupling said image data output means to said display means to transfer the plurality of parallel bits of image data to said display means; and
   said display means including a multiplier circuit for frequency-multiplying clock pulses at a predetermined frequency, means for receiving the plurality of parallel bits of image data through said plurality of transmission lines of the interface cable and for converting the parallel bits of image data into serial data in synchronism with the multiplied clock pulses from said multiplier circuit, and cathode-ray tube means for displaying the serial data obtained from said conversion means as the image.

2. The apparatus according to claim 1, wherein said receiving and converting means comprises a parallel-in/serial-out shift register having 16 data input terminals for receiving the parallel bits of image data and performing a shift operation in synchronism with said multiplied clock pulse signals.

3. The apparatus according to claim 2, wherein said multiplier circuit comprises means for receiving clock pulses at a predetermined frequency, and a phase-locked loop circuit for multiplying the frequency of the clock pulses at a predetermined frequency by 16 to form said multiplied clock pulse signal.

4. The apparatus according to claim 1, wherein said cathode-ray tube means comprises a high resolution cathode-ray tube, for displaying an image, with 2,400 scanning lines.

5. A display apparatus, comprising:
   document filing arrangement means for outputting image data corresponding to a document as 16 parallel bits of data;
   means for receiving the 16 parallel bits of data from said document filing arrangement means and for converting the 16 parallel bits of data into serial image data, in synchronism with a clock pulse signal having a predetermined frequency, wherein said receiving and converting means comprises means for receiving a reference signal having a predetermined frequency, and a phase-locked loop circuit for multiplying the frequency of the reference signal by 16 to form said clock pulse signal; and
   cathode-ray tube means for displaying the serial data obtained from said converting means as the document image.

6. A document filing apparatus for filing an image of a document, comprising:
   a main unit for outputting image data corresponding to the document as N parallel bits of data, wherein N equals $2^n$, and n is a positive integer;
   display means for displaying the image data corresponding to the document as a document image having a high resolution, said display means being disposed separate from said main unit;
   an interface cable for coupling said main unit to said display means, said interface cable having N transmission lines for transferring the parallel bits of data to said display means; and
   said display means including a multiplier circuit for frequency-multiplying clock pulses at a predetermined frequency, means for receiving the parallel bits of data through said transmission lines of said interface cable and converting the parallel bits of data into serial data in synchronism with the multiplied clock pulses from said multiplier circuit, and cathode-ray tube means for displaying the serial data obtained from said conversion means as the document image.

* * * * *